E. SOKAL.
STORAGE BATTERY.
APPLICATION FILED JULY 2, 1909.
1,034,156.
Patented July 30, 1912.
2 SHEETS—SHEET 1.
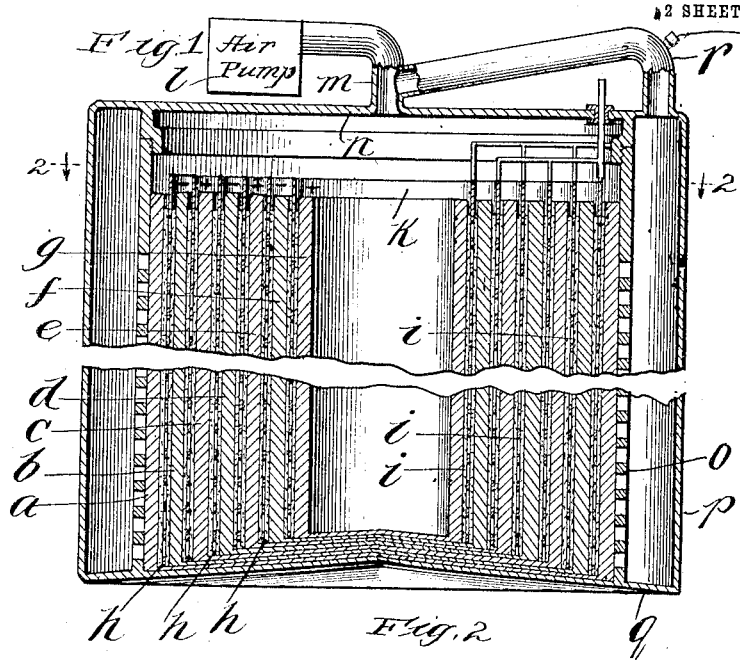
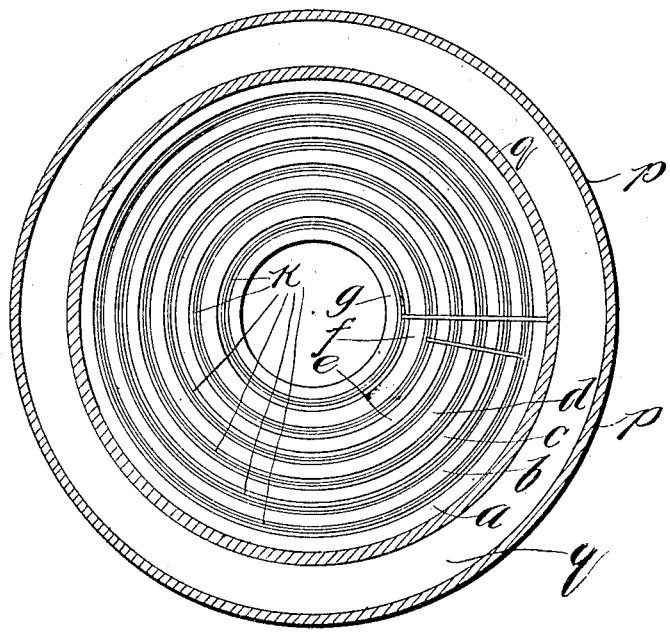
Witnesses:
Inventor:
Edward Sokal,
By G. L. Cross
Atty E. SOKAL.
STORAGE BATTERY.
APPLICATION FILED JULY 2, 1909.
1,034,156.
Patented July 30, 1912.
2 SHEETS—SHEET 2.
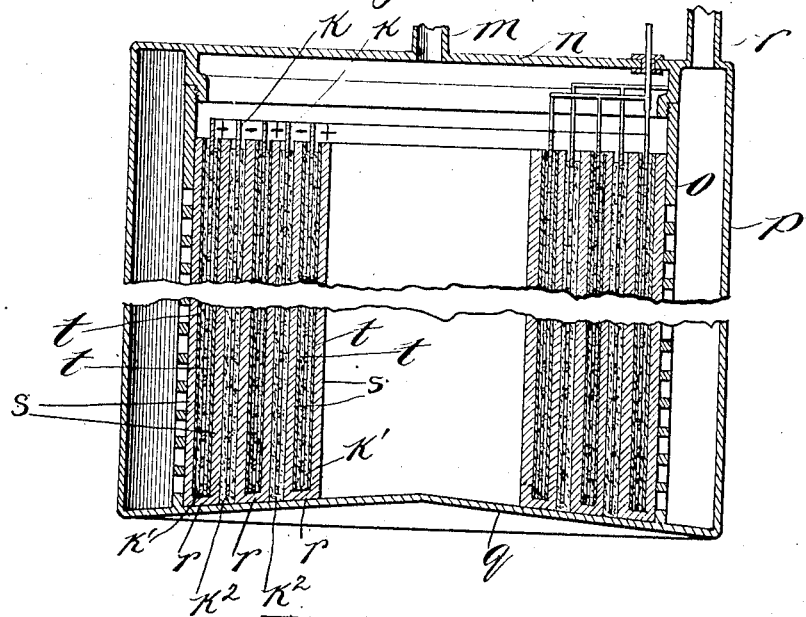
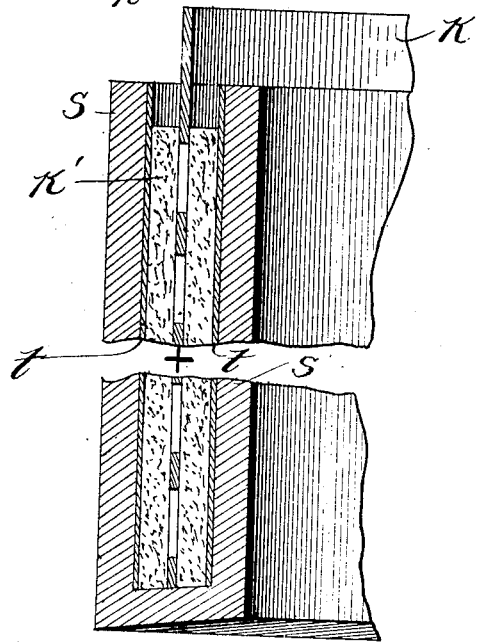
Witnesses:
Inventor,
Edward Sokal
By G. L. Gregg
Atty

UNITED STATES PATENT OFFICE.

EDWARD SOKAL, OF CHICAGO, ILLINOIS.

STORAGE BATTERY.

1,034,156.   Specification of Letters Patent.   Patented July 30, 1912.

Application filed July 2, 1909. Serial No. 505,571.

*To all whom it may concern:*

Be it known that I, EDWARD SOKAL, citizen of Austria-Hungary, residing at Chicago, in the county of Cook and State of Illinois, United States of America, have invented a certain new and useful Improvement in Storage Batteries, of which the following is a full, clear, concise, and exact description, reference being had to the accompanying drawings, forming a part of this specification.

My invention relates to storage batteries, and has a number of objects and advantages in view.

One feature of my invention relates to that class of storage batteries in which means are employed for forcibly effecting circulation of electrolyte through the pores of the active material of the battery electrodes, a battery of the prior art in which the electrolyte is forcibly circulated being shown in my Patent No. 852,464, dated May 7, 1907.

Another feature of my invention relates to a construction and relative arrangement of the battery electrodes and the separators.

My invention will be very fully understood by a description of certain embodiments thereof illustrated in the accompanying drawings, in which—

Figure 1 is a sectional elevation of one form of battery constructed in accordance with the invention, in association with means, diagrammatically indicated, for effecting forcible circulation of the electrolyte. Fig. 2 is a sectional plan view on line 2 2 of Fig. 1. Fig. 3 is a sectional elevation of another form of storage battery structure. Fig. 4 is a detail view of the structure shown in Fig. 3.

Like parts are indicated by similar characters of reference throughout the different figures.

Referring first more particularly to Figs. 1 and 2, there are shown in these figures a structure comprising a plurality of nested walls $a\ b\ c\ d\ e\ f$ and $g$, made of some suitable porous material, such, for example, as is employed in making earthen ware. These walls are desirably cylindrical and have spaces intervening between the same, which are, therefore, annular, certain of these annular spaces containing similar electrodes $h$ and alternate annular spaces containing similar electrodes $i$ that are complemental to the electrodes $h$; that is, the electrodes $h$ are of one polarity and the electrodes $i$ are of an opposite polarity. These electrodes may be built in any suitable way. I prefer to form them by inserting perforated sheets $k$, of lead, within the annular spaces and filling these annular spaces with suitable active material in a dry state, which finds its way into the interstices in the leaden sheets and constitutes, together with said leaden sheets, the electrodes of the battery. This active material is preferably moistened after its insertion, thereafter seasoned and firmly located by means of pressure. In this way excellent contact is afforded between the active material and the conducting lead sheets $k$, and, moreover, said sheet need not be made strong, as they do not act as supports for the active material, which is held within the apertures in the leaden sheets mainly independently of the leaden sheets. The porous cups are preferably higher than the active material, to prevent short-circuit.

The electrodes $h$ are conductively united and connected with a common terminal, and the electrodes $i$ are likewise conductively connected and lead to another common terminal, all as will be well understood by those skilled in the art. The annular walls $a\ b\ c\ d\ e\ f$ and $g$ desirably form the annular walls of porous cups or jars, each annular wall being joined with a bottom wall distinctly from each other annular wall, so that there is constituted, as is illustrated in Figs. 1 and 2, a nest of jars or cups with electrodes of one sign alternating with the electrodes of the opposite sign.

The electrolyte is contained in the central cup $g$, and where this electrolyte is to be subjected to pressure, I employ some suitable means for effecting this pressure, as an air-pump $l$, an air-pipe $m$ leading from said pump through the top wall $n$ of a casing which incloses the battery elements which have been above described.

In adapting the storage battery of my present invention to an arrangement wherein the electrolyte has forced circulation, I desirably surround and snugly engage the outer porous cup $a$ by a wall $o$, of lead, which is plentifully perforated, so as to permit the passage of electrolyte that is forced through the porous cylindrical walls of the porous cups which have been described and which electrolyte is also forced through the pores of the active material of the electrodes that intervene between the walls of these cups. A leaden jacket $p$ surrounds the perforated wall o and affords an annular or cylindrical chamber surrounding the wall o, into which chamber the electrolyte is received. The electrolyte desirably fills all of the free space within the inclosing chamber, that includes the top n, the outer wall p and the bottom q, which affords a support for the porous cups.

It will be seen that I have produced a storage battery in which the electrodes are much simplified in construction and whose durability is materially increased. The number of lead and rubber connections is also reduced and leakage is eliminated.

The storage battery of my construction may be incased in metal and need not require the use of rubber jars in vehicle work as containers for the electrolyte.

An outlet pipe r communicates with the outer chamber above mentioned, whereby the electrolyte forced into said outlet chamber may be returned through the pipe m through the central porous cup g. The pipe r has a vent-valve $r^1$ for the escape of gas.

In Figs. 3 and 4 I have shown another way of carrying out the invention. In the structure shown in these figures, I have illustrated a storage battery having many elements similar to elements of the structure found in Figs. 1 and 2, and these similar elements are given similar characters of reference. One of the main distinctions between the structure of Figs. 1 and 2 and the structure of Figs. 3 and 4 resides in the construction of the nested porous cups, each of which in Figs. 3 and 4, is provided with an annular bottom r, each resting upon the bottom q of the leaden outer case, each cup possessing also two concentric cylindrical walls s. Between each pair of walls s of each cylindrical cup, cylindrical leaden sheets k are inserted, which sheets are perforated so as to receive the active material $k^1$ that is put in place in the manner which has been described in connection with the structure shown in Figs. 1 and 2. The nested porous cups in the structure of Figs. 3 and 4, are also so nested that annular spaces intervene between the same, in which annular spaces other perforated leaden plates k are inserted and in which latter annular spaces active material $k^2$ is placed in a manner which has been described.

The active material entering into the construction of the positive electrode is more apt to work its way into the pores of the porous walls than is the material of the negative electrode. On this account, I interpose some filtering medium between the active positive material and the porous walls. I preferably employ as a filtering medium, thin sheets t, of wood, that are placed immediately next the porous walls. These wooden sheets act as screens or filtering medium, for the purpose stated.

I prefer the double wall cups, inasmuch as they permit the removal therewith of the positive electrodes without disturbing the negative electrodes.

By using pressure in connection with the battery structure herein described, I am enabled greatly to reduce the electrical resistance offered by the porous walls, inasmuch as the electrolyte within the porous walls is maintained at the maximum of its conductivity. It will further be noted that both surfaces of each electrode are subject to electrolytic action, each electrode surface having the surface of a complemental electrode facing it, excepting, of course, the outer and inner electrodes.

In my co-pending application Serial No. 505,572, filed July 2, 1909, I have disclosed equipment having some features in common with the equipment herein disclosed.

It is obvious that many changes may be made in the form of the invention herein shown and particularly described, without departing from the spirit of the invention, and I do not, therefore, wish to be limited to the precise construction shown, but,

Having thus described my invention, I claim as new and desire to secure by Letters Patent the following:—

1. A storage battery including electrodes formed of plates and active material, porous walls between which the electrodes are disposed and operating to hold said active material in place with respect to said plates, an electrolyte, and means for forcing the circulation of the electrolyte through the pores of the active material of the electrodes and through the porous walls.

2. A storage battery including electrodes formed of plates and active material, nested porous walls between which the electrodes are disposed and operating to hold said active material in place with respect to said plates, an electrolyte, and means for forcing the circulation of the electrolyte through the pores of the active material of the electrodes and through the porous walls.

3. A storage battery including electrodes formed of plates and active material, nested porous cups between walls of which the electrodes are disposed, said walls operating to hold said active material in place with respect to said plates, an electrolyte, and means for forcing the circulation of the electrolyte through the pores of the active material of the electrodes and through the porous walls.

4. A storage battery including electrodes formed of plates and active material, a plurality of nested porous cups, each having two walls between which an electrode is disposed, said walls operating to hold said active material in place with respect to said plates, an electrolyte, and means for forcing the circulation of the electrolyte through the pores of the active material of the electrodes and through the porous walls.

5. A storage battery including electrodes formed of plates and active material, a plurality of nested porous cups, each having two walls between which an electrode is disposed, said walls operating to hold said active material in place with respect to said plates, spaces also intervening between adjacent cups in which other electrodes are disposed, adjacent walls of adjacent cups also operating to hold the active material of the latter electrodes with respect to said plates, an electrolyte, and means for forcing the circulation of the electrolyte through the pores of the active material of the electrodes and through the porous walls.

6. A storage battery including electrodes having active material in their structure, a plurality of nested porous cups, each having two walls between which an electrode is disposed, an electrolyte, and means for forcing the circulation of the electrolyte through the pores of the active material of the electrodes and through the porous walls.

7. A storage battery including electrodes having active material in their structure, a plurality of nested porous cups, each having two walls between which an electrode is disposed, spaces also intervening between adjacent cups in which other electrodes are disposed, an electrolyte, and means for forcing the circulation of the electrolyte through the pores of the active material of the electrodes and through the porous walls.

8. A storage battery including electrodes formed of plates and active material, a plurality of nested porous cups, each having two walls between which an electrode is disposed, said walls operating to hold said active material in place with respect to said plates, spaces also intervening between adjacent cups in which other electrodes are disposed, an electrolyte, and means for forcing the circulation of the electrolyte through the pores of the active material of the electrodes and through the porous walls.

9. A storage battery including an electrode formed of a plate and active material, a porous cup having two walls between which the electrode is disposed, said walls operating to hold said active material in place with respect to said plate, an electrolyte, and means for forcing the circulation of the electrolyte through the pores of the active material of the electrode and through the porous walls.

10. A storage battery including an electrode having active material in its formation, a porous cup having two walls between which the electrode is disposed, an electrolyte, and means for forcing the circulation of the electrolyte through the pores of the active material of the electrode and through the porous walls.

11. A storage battery including electrodes having active material in their construction, nested porous walls between which the electrodes are disposed, an electrolyte, and means for forcing circulation of the electrolyte through the pores of the active material of the electrodes and through the porous walls.

12. A storage battery including electrodes having active material in their construction, porous walls between which the electrodes are disposed, said electrodes alternating in sign or polarity, an electrolyte, and means for forcing circulation of said electrolyte through said porous walls and through the pores of the active material of the electrodes.

13. A storage battery including electrodes having active material in their construction, nested porous walls between which the electrodes are disposed, said electrodes alternating in sign or polarity, an electrolyte, and means for forcing circulation of said electrolyte through said porous walls and through the pores of the active material of the electrodes.

14. A storage battery including electrodes having active material in their construction, nested porous cups between whose porous walls the electrodes are disposed, said electrodes alternating in sign or polarity, an electrolyte, and means for forcing circulation of said electrolyte through said porous walls and through the pores of the active material of the electrodes.

15. A storage battery including a porous wall, an electrode having active material in its formation facing the same, a filtering medium interposed between the active material of the electrode and the porous wall, an electrolyte, and means for forcing the circulation of the electrolyte through the porous wall and through the pores of the active material of the electrode.

16. A storage battery including electrodes having active material in their construction, nested porous walls between which the electrodes are disposed, an inclosing casing of lead defining a chamber exterior to the electrodes and porous walls, an electrolyte adapted for circulation through the electrodes, the porous walls and the chamber exterior to the electrodes and porous walls, and means for forcing circulation of the electrolyte through said porous walls, through the pores of the active material of the electrodes and through the outer chamber.

17. A storage battery including electrodes having active material in their construction, porous walls between which the electrodes are disposed, an inclosing casing of lead defining a chamber exterior to the electrodes and porous walls, an electrolyte adapted for circulation through the electrodes, the porous walls and the chamber exterior to the electrodes and porous walls, and means for forcing circulation of the electrolyte through said porous walls, through the pores of the active material of the electrodes and through the outer chamber.

18. A storage battery including electrodes having active material in their construction, nested porous walls between which the electrodes are disposed, said electrodes alternating in sign or polarity, an inclosing casing of lead defining a chamber exterior to the electrodes and porous walls, an electrolyte adapted for circulation through the electrodes, the porous walls and the chamber exterior to the electrodes and porous walls, and means for forcing circulation of the electrolyte through said porous walls, through the pores of the active material of the electrodes and through the outer chamber.

19. A storage battery including porous walls between which electrodes are disposed, said electrodes alternating in sign or polarity, an inclosing casing of lead defining a chamber exterior to the electrodes and porous walls, an electrolyte adapted for circulation through the pores of the active material of the electrodes, through the porous walls and through the chamber exterior to the electrodes and porous walls, and means for forcing circulation of the electrolyte through said porous walls, electrodes and outer chamber.

In witness whereof, I hereunto subscribe my name this 1st day of July A. D. 1909.

EDWARD SOKAL.

Witnesses:
L. G. Stroh,
G. L. Cragg.